(12) United States Patent
Liu et al.

(10) Patent No.: US 7,577,642 B2
(45) Date of Patent: *Aug. 18, 2009

(54) TECHNIQUES OF XML QUERY OPTIMIZATION OVER STATIC AND DYNAMIC HETEROGENEOUS XML CONTAINERS

(75) Inventors: Zhen Hua Liu, San Mateo, CA (US); Muralidhar Krishnaprasad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 11/486,794

(22) Filed: Jul. 13, 2006

(65) Prior Publication Data

US 2008/0016122 A1   Jan. 17, 2008

(51) Int. Cl.
*G06F 7/00* (2006.01)

(52) U.S. Cl. .................. 707/3; 707/103 R; 715/234

(58) Field of Classification Search .............. 707/3, 707/103 R, 200

See application file for complete search history.

(56) References Cited

U.S. PATENT DOCUMENTS

| | | | |
|---|---|---|---|
| 5,717,911 A | 2/1998 | Madrid et al. | |
| 5,950,188 A | 9/1999 | Wildermuth | |
| 6,356,887 B1 * | 3/2002 | Berenson et al. | 707/2 |
| 6,356,889 B1 * | 3/2002 | Lohman et al. | 707/2 |
| 6,487,552 B1 | 11/2002 | Lei et al. | |
| 6,536,889 B1 | 3/2003 | Biegelsen et al. | |
| 6,745,206 B2 | 6/2004 | Mandler et al. | |
| 6,836,778 B2 | 12/2004 | Manikutty et al. | |
| 7,007,033 B1 | 2/2006 | Rothschiller et al. | |
| 7,013,311 B2 * | 3/2006 | Hui et al. | 707/104.1 |
| 7,031,956 B1 | 4/2006 | Lee et al. | |
| 7,099,858 B2 * | 8/2006 | Aldrich et al. | 707/2 |
| 7,167,848 B2 * | 1/2007 | Boukouvalas et al. | 706/14 |
| 7,359,922 B2 * | 4/2008 | Young-Lai et al. | 707/200 |
| 2002/0007375 A1 * | 1/2002 | Ebata | 707/513 |
| 2002/0073019 A1 | 6/2002 | Deaton | |
| 2002/0099952 A1 | 7/2002 | Lambert et al. | |
| 2002/0116457 A1 | 8/2002 | Eshleman et al. | |
| 2002/0133497 A1 * | 9/2002 | Draper et al. | 707/100 |
| 2003/0028561 A1 | 2/2003 | Gounares et al. | |
| 2003/0046270 A1 | 3/2003 | Leung et al. | |
| 2003/0097383 A1 | 5/2003 | Smirnov et al. | |

(Continued)

OTHER PUBLICATIONS

U.S. Appl. No. 10/944,171, filed Sep. 16, 2004.

(Continued)

*Primary Examiner*—Tim T Vo
*Assistant Examiner*—Anh Tai Tran
(74) *Attorney, Agent, or Firm*—Hickman Palermo Truong & Becker LLP; Daniel D. Ledesma

(57) ABSTRACT

A method and apparatus for optimizing XML queries over heterogeneous XML tables is provided. A query that targets a container (e.g. table or collection) that contains a plurality of XML documents is received, wherein at least two XML documents in the plurality do not conform to the same schema. Based on the received query, a plurality of execution plans is generated. Each execution plan is associated with a different XML schema. An execution plan is used to execute the query relative to those XML documents that conform to the XML schema associated with the execution plan.

44 Claims, 3 Drawing Sheets

U.S. PATENT DOCUMENTS

| | | | |
|---|---|---|---|
| 2003/0115548 | A1 | 6/2003 | Melgar |
| 2004/0064466 | A1* | 4/2004 | Manikutty et al. ........... 707/100 |
| 2004/0093344 | A1* | 5/2004 | Berger et al. ................ 707/102 |
| 2004/0148278 | A1* | 7/2004 | Milo et al. ...................... 707/3 |
| 2004/0243555 | A1* | 12/2004 | Bolsius et al. .................. 707/3 |
| 2004/0267760 | A1 | 12/2004 | Brundage et al. |
| 2005/0091287 | A1 | 4/2005 | Sedlar |
| 2005/0120029 | A1* | 6/2005 | Tomic et al. ................. 707/100 |
| 2005/0289125 | A1 | 12/2005 | Liu et al. |
| 2006/0010124 | A1 | 1/2006 | Lucas et al. |
| 2006/0101011 | A1* | 5/2006 | Lindsay et al. .................. 707/4 |
| 2006/0195417 | A1 | 8/2006 | Acharya et al. |
| 2006/0235840 | A1 | 10/2006 | Manikutty et al. |
| 2007/0011167 | A1 | 1/2007 | Krishnaprasad et al. |
| 2007/0288429 | A1 | 12/2007 | Liu et al. |

OTHER PUBLICATIONS

U.S. Appl. No. 11/034,490, filed Jan. 12, 2005.

Almarimi, A. et al., "A Mediation Layer For Heterogeneous XML Schemas", date unknown, 11 pages.

Chen, C. et al., "Query Translation Scheme for Heterogeneous XML Data Sources", (2005) pp. 31-38, ACM, Bremen, Germany.

Mandreoli, F. et al., "Approximate Query Answering for a Heterogeneous XML Document Base" date unknown, 12 pages.

Votsch et al., "Oracle XML DB: Uniting XML Content and Data", Seybold Consulting Group, 2002, 14 pages.

Krishnaprasad et al., Proceedings of the $30^{th}$ VLDB Conference, Toronto Canada, 2004, 11 pages.

Du, F., "Moving from XML Documents to XML Databases", Thesis, University of British Columbia, Mar. 2004, 42 pages.

Melton, J., "SQLX Bringing XML and SQL Together", JISBD2001, Jornada de Ingenieria del Software y Bases de Datos, Almagro, Espana, 2001, 156 pages.

Smith et al., "Microsoft Windows Security Resource Kit", Microsoft Press, Second Edition, Mar. 30, 2005, 10 pages.

Reese, "Java Database Best Practices", O'Reilly Press, May 2003, 11 pages.

* cited by examiner

HETEROGENEOUS XML TABLE 100

| ROWID (110) | SCHEMA_ID (120) | PO_ID (130) | PO_DATE (140) | PO_DEST_CITY (150) | DOC_REF (160) |
|---|---|---|---|---|---|
| R1 | S3 | P102 | 03/16/08 | SFO | DR1 (101) |
| R2 | S2 | P108 | 03/17/08 | ---- | DR2 (102) |
| R3 | S3 | P113 | 03/17/08 | DFW | DR3 (103) |
| R4 | S1 | P129 | 03/20/08 | ATL | DR4 (104) |
| R5 | S4 | P131 | 03/20/08 | SFO | DR5 (105) |
| R6 | S3 | P134 | 03/21/08 | PHX | DR6 (106) |
| R7 | S3 | P136 | 03/21/08 | LAX | DR7 (107) |
| R8 | S2 | P142 | 03/22/08 | ---- | DR8 (108) |
| R9 | S4 | P163 | 03/22/08 | SFO | DR9 (109) |
| ... | ... | ... | ... | ... | ... |
| R98 | S3 | P715 | 3/22/08 | LAX | DR98 (111) |

*FIG. 1*

Receive a query that targets a container that contains a plurality of XML documents, wherein at least two of the XML documents do not conform to the same XML schema
202

Generate a plurality of execution plans, wherein each execution plan is associated with a different XML schema
204

Use each execution plan to execute the query relative to those XML documents that conform to the XML schema associated with the execution plan
206

*FIG. 2*

TECHNIQUES OF XML QUERY OPTIMIZATION OVER STATIC AND DYNAMIC HETEROGENEOUS XML CONTAINERS

CROSS-REFERENCE TO RELATED APPLICATIONS

This application is related to:

U.S. patent application Ser. No. 10/428,878 filed on May 1, 2003, entitled "Techniques For Rewriting XML Queries Directed to Relational Database Constructs";

U.S. patent application Ser. No. 11/044,472 filed Jan. 26, 2005, entitled "Technique of Using XMLType Tree as the Type Infrastructure for XML";

U.S. patent application Ser. No. 11/237,286 filed Sep. 27, 2005, entitled "Optimizations of Queries Over XML Views That Are Based on Union All Operators";

U.S. patent application Ser. No. 11/243,345 filed Oct. 3, 2005, entitled "Optimization of Queries on a Repository Based on Constraints on How the Data is Stored in the Repository";

U.S. patent application Ser. No. 11/452,769 filed Jun. 13, 2006, entitled "Techniques of Optimizing XQuery Functions Using Actual Argument Type Information"; and U.S. patent application Ser. No. 11/486,798 filed Jul. 13, 2006, entitled "Techniques of XML Query Optimization Over Dynamic Heterogeneous XML Containers";

the entire contents of all of which are incorporated by this reference for all purposes as if fully disclosed herein.

FIELD OF THE INVENTION

The present invention relates to optimizing XML queries, and more particularly to optimizing queries that target heterogeneous XML tables.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML is a markup language that allows tagging of document elements and provides for the definition, transmission, validation, and interpretation of data between applications and between organizations. The XML specification was developed by the W3C consortium and is located on the Internet at "http://www.w3.org/XML".

XML Data Models

An important standard for XML is the XQuery 1.0 and XPath 2.0 Data Model (see W3C Working Draft, 29 Oct. 2004, which is incorporated herein by reference and referred to hereinafter as the XQuery Data Model).

One aspect of the XQuery Data Model is that XML data is represented by a hierarchy of nodes that reflects the hierarchical nature of the XML data. A hierarchy of nodes is composed of nodes at multiple levels. The nodes at each level are each linked to one or more nodes at a different level. Each node at a level below the top level is a child node of a node at the level above. Nodes at the same level may be sibling nodes. In a tree hierarchy or node tree, each child node has only one parent node, but a parent node may have multiple child nodes.

In a tree hierarchy, a node that has no parent node linked to it is the root node, and a node that has no child nodes linked to it is a leaf node. A tree hierarchy has a single root node.

In a node tree that represents an XML document, a node can correspond to an element, the child nodes of the node correspond to an attribute or another element contained in the element. The node may be associated with a name and value. For example, for a node tree representing the element book, the name of the node associated with element book is book, and the value is 'My book'. For a node representing the attribute publisher, the name of the node is publisher and the value of the node is 'Doubleday'.

For convenience of expression, elements and other parts of an XML document are referred to as nodes within a tree of nodes that represents the document. Thus, referring to "My book" as the value of the node with name "book" is just a convenient way of expressing that the value of the element associated with node "book" is "My book".

XML Schemas

Information about the structure of specific types of XML documents may be specified in documents referred to as "XML schemas". For example, the XML schema for a particular type of XML document may specify element definitions and type definitions. XML documents that conform to a XML schema may be referred to as XML schema instances. Standards governing XML schemas include XML Schema Part 0: Primer Second Edition, W3C Recommendation, 28 Oct. 2004, the contents of which are incorporated herein by reference, XML Schema Part 1: Structures, Second Edition, W3C Recommendation 28 Oct. 2004, the contents of which are incorporated herein by reference, and XML Schema Part 2: Datatypes Second Edition, W3C Recommendation 28 Oct. 2004, the contents of which incorporated herein by reference.

XML Storage Mechanisms

Various types of storage mechanisms are used to store an XML document. One type of storage mechanism stores an XML document as a text file in a file system.

Another type of storage mechanism uses object-relational database systems that are enhanced to store and process queries for collections of XML documents. Furthermore, these object-relational database systems can store and manage XML documents as XML schemas instances. To store and manage the XML documents in a database system, database representations, defined in terms of datatypes handled by the database system (referred to herein as database types), are used to represent XML documents. Database types include, for example, native database types, such as integer and VARCHAR ("variable length character string"), or object types defined for a database system using DDL statements (data definition language statements).

For example, a database representation of an entire XML document may be a BLOB (binary large object), or maybe one or more tables whose columns store an element of XML documents. A database representation may be a hierarchy of objects in an object-relational database; each object is an instance of an object class and stores one or more elements of a XML document. The object class defines, for example, the structure corresponding to an element, and includes references or pointers to objects representing the immediate descendants of the element.

XML Tables

Tables that store XML documents are referred to herein as XML tables. XML tables may be homogeneous or heterogeneous. A homogeneous XML table refers to an XML table that either (a) stores only XML documents that all conform to a single XML schema, or (b) stores only XML documents that conform to no schema. An example of a homogeneous XML table is a table containing all XML documents conforming to a purchaseOrder schema.

A heterogeneous XML table is an XML table that stores XML documents that 1) conform to two or more different schemas or 2) conform to one or more schemas and XML documents that conform to no schema. If a heterogeneous XML table is limited to XML documents that conform to a particular set of XML schemas, then the heterogeneous XML table is referred to as a "static heterogeneous XML table" or ST. On the other hand, if a heterogeneous XML table is not limited to a particular set of XML schemas, then the heterogeneous XML table is referred to as a "dynamic heterogeneous XML table" or DT. Both STs and DTs may include non-schema based XML documents.

Compiling Xqueries

XQuery is designed to be a language in which queries are concise and easily understood. XQuery is also flexible enough to query a broad spectrum of XML information sources, including both databases and documents. XQuery operates on the abstract, logical structure (i.e., the data model) of an XML document, rather than its surface syntax. However, XQuery, a dynamic typing language, provides significant performance challenges. For example, in a statement "$x+$y", $x and $y could either be two numbers, a date and a duration, two strings, or some other datatype. Although dynamic typing allows for considerable flexibility, it is highly inefficient because type checking must then be performed at runtime when system resources are more limited.

On the other hand, if the query compiler knows what type the variables $x and $y are, then the compiler can perform the type checking so that the execution engine does have to. In addition to type checking, information about the schema of the documents that are targeted by an XQuery may allow the compiler to perform certain query optimizations that would otherwise not be possible.

Currently, when a query is applied to all XML documents stored in a homogeneous XML table, compilation and optimization of the query is relatively straightforward because all XML documents in the homogeneous table conform to a common XML schema whose details are known to the compiler. Therefore, static type checking (i.e. at compile time) may be applied to the query and all type-based optimizations may be applied to optimize the query based on the XML schema. Examples of optimizations include using the schema to determine if the XPath used in the query is valid, expanding the wildcard or child or descendent XPath steps into concrete XPath steps based on the actual schema information, compiling the query into the optimal plan based on the precise type from the schema, eliminating as much dynamic typing as possible during runtime due to static validation and checking accomplished during compile time, and determining that an index exists on an XPath in the submitted query so that the index is accessed at runtime.

However, when a query is applied to a heterogeneous XML table (either an ST or a DT), then static type checking of the query and type-based optimizations are not performed, because the query compiler does not "know" in advance the schema to which a particular XML document in the table conforms. Presently, there is not an efficient way to do proper type-based optimizations on an XQuery that targets an ST or DT. As a result, the dynamic type checking is performed by an XQuery engine that executes the XQuery, which results in slow performance.

Further, certain compiler-time optimizations are not possible for queries that target heterogeneous XML tables. For example, a query processor can not determine if a particular XPath is valid in the query to potentially eliminate certain branches of the query during query compile time.

DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of an example heterogeneous XML table, according to an embodiment of the invention;

FIG. 2 is a flow diagram that illustrates how child queries may be generated based on a submitted query, according to an embodiment of the invention.

DETAILED DESCRIPTION

Figure 3:
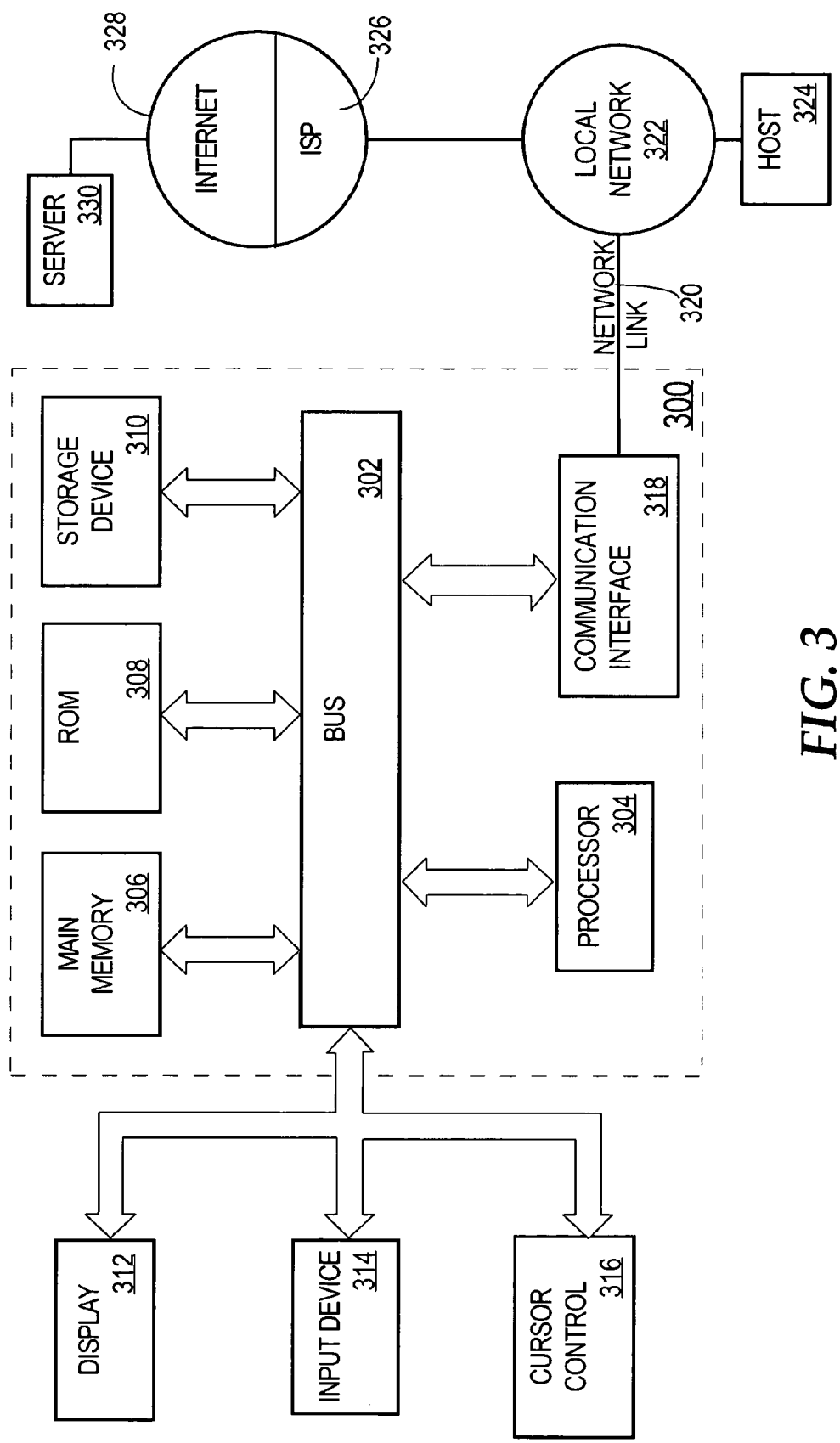
FIG. 3 is a block diagram of a system upon which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

As mentioned above, static type checking and certain compile-time query optimizations are currently performed only for queries that target homogeneous XML tables (i.e. tables that store XML documents that all conform to the same XML schema). Techniques are described herein that allow static type checking and certain compile-time query optimizations to also be performed for queries that target heterogeneous XML tables. According to one such technique, when a query that targets a heterogeneous table is received, the compiler generates one or more execution plans. Each execution plan is specific to a particular XML schema. Thus, each execution plan targets a subset of the XML documents in the heterogeneous table. The XML documents targeted by any given execution plan conform either to the same XML schema, or to no XML schema.

If the schemas in a heterogeneous table are not known to a compiler at compile time of a query (e.g. in the case of some DTs, but not in the case of STs), then, at runtime of the query, the execution engine determines the XML schema to which each XML document in the DT conforms. When an execution engine executes a query against a DT, for each XML document in the DT, the execution engine determines the schema associated with the XML document. Once the execution engine determines the schema associated with the XML document, the execution engine determines whether the execution engine has already generated and saved an execution plan for the query relative to that schema. If the execution engine has not already generated and saved an execution plan for the query relative to the schema, then the execution engine generates, executes and saves an execution plan for the query relative to the schema. If the execution engine has already generated and saved an execution plan for the query relative to the schema, then the execution engine uses the execution plan that was generated previously for the query relative to the schema.

According to an embodiment, the execution engine maintains statistics about a heterogeneous table, such as how many documents within the heterogeneous table are there for each XML schema. Certain "statistics-gathering queries" may be executed to gather such statistics. As an example of maintaining statistics, a statistics-gathering query is executed against the heterogeneous table to determine the particular XML schemas represented by the documents in the heterogeneous table.

According to one embodiment, the statistics may be used to determine how to compile a query that targets the heterogeneous table. For example, if the statistics-gathering query produced results indicating that the heterogeneous XML table targeted by a query included documents that conform to schemas X, Y and Z, then during compile time of that query, the query compiler may generate execution plans for schemas X, Y and Z.

By generating execution plans that each target a particular XML schema, static type checking and schema-specific query optimizations may be performed during compile time, resulting in execution times similar to execution times of queries that target homogeneous tables.

XML Document Storage Implementations

Various techniques exist for storing XML documents. XML documents may be stored as tables, collections, folders, virtual folders, directories, views, or as a stream of XML documents. The various structures in which XML documents may be stored are collectively referred to herein as XML containers. The techniques described herein are applicable to whatever form of XML container is used to store XML documents. Thus, the techniques may be used to generate child queries for queries that initially target heterogeneous folders, collections, directories and streams, as well as tables.

For the purpose of illustration, examples shall be given herein in which the XML documents are stored in a table. Even when the XML container that contains XML documents is not a table, techniques may be used to access the documents as if the documents were contained in a table. For example, U.S. patent application Ser. No. 11/243,345 describes how a folder may be mapped to a table. Thus, if a folder contains XML documents conforming to multiple XML schemas, the folder may first be mapped to a table, and then the techniques described herein may be applied as if the XML documents were stored in the table.

Heterogeneous XML Tables

Heterogeneous XML tables may internally generate many hidden columns to store various parts of the XMLType value. Typically, the columns in a heterogeneous XML table are based on certain nodes and/or XPaths specified in one or more XML schemas. For example, suppose a heterogeneous XML table stores several types of XML documents, including purchase order ("PO") documents that conform to a PurchaseOrder schema. Further suppose that the root node in a PO document has the following child nodes: POid, PODate, and PODestCity. Thus, columns in the heterogeneous XML table may include one column for each of nodes POid, PODate, and PODestCity.

According to one embodiment, heterogeneous XML tables also include a column that stores values that identify the particular XML schemas to which XML documents conform. Such a column is referred to herein as a "schema Id column". For example, a row that corresponds to a PO document may store, in the schema column, information that identifies the PurchaseOrder schema.

FIG. 1 is a block diagram of a heterogeneous XML table 100, according to an embodiment of the invention. Each row in table 100 is associated with a different PO document. Table 100 comprises six columns. Column 110 indicates a row identifier ("ROWID") of a row in table 100, column 120 indicates a schema identifier ("SCHEMA_ID") of a PO document, column 130 indicates a purchase order identifier ("PO_ID") of a PO document, column 140 indicates a purchase order date ("PO_DATE") of a PO document, column 150 indicates a destination city ("PO_DEST_CITY") associated with a PO document, and column 160 indicates a reference ("DOC_REF") to access an entry in another data structure that stores (e.g. as a binary large object (BLOB)) the corresponding PO document.

Thus, the PO document corresponding to row 101 indicates a row identifier of "r1", a schema identifier of "s3", a purchaser order identifier of "P102", a date of "Mar. 16, 2008", a destination city of "SFO", and a document reference of "DR1".

Table 100 is one example of how a heterogeneous XML table may be implemented. However, embodiments of the invention are not limited to the foregoing description. For example, table 100 may comprise more or fewer columns, depending on the schemas of the XML documents stored therein. Furthermore, table 100 may comprise one column that stores the actual data of an XML document corresponding to a row in CLOB or BLOB form.

Query optimizations may be performed when the XML schema of XML documents are statically known (i.e. at compile time), such as in the case for STs and sometimes in the case for DTs. An example of a query optimization is where the compiler generates an execution plan that accesses an index is based on an XPath (e.g./PO/POid) indicated by an XML schema. During runtime of the query, the index is accessed to execute the query, thus saving the time that would otherwise be required to manifest the entire XML document.

In the case of a DML operation indicating a modification, an index may be used so that a single column of a table is changed, as opposed to having to manifest the entire XML document, traverse the XML document, make the modification, and then save the modification. Previously, these types of optimizations were only possible for queries that targeted homogeneous tables.

Generating Execution Plans

Currently, if an XML table is heterogeneous, then certain query optimizations are not performed because the query optimizations depend on the fact that the XML documents in the table targeted by the query conform to a single XML schema. In contrast, the techniques described herein allow those query optimizations to be performed even though the documents within the heterogeneous table do not conform to a single XML schema.

Schema-specific optimizations are made during compile time by compiling multiple query execution plans during compile time, where each of the execution plans is optimized based on a different XML schema. Then, depending on an XML document instance in the heterogeneous XML table that is targeted by the query during runtime, the execution engine executes the correct plan from the multiple compiled execution plans.

FIG. 2 is a flow diagram that illustrates how execution plans may be generated based on a submitted query, according to an embodiment of the invention. At step 202, a query is received that targets a container that contains a plurality of XML documents (e.g. in table 100) that conform to different XML schemas. At step 204, a plurality of execution plans are generated. Each execution plan is specific to a particular XML schema and no two execution plans are specific to the same XML schema. For example, based on the four XML schemas represented in table 100 (i.e. s1, s2, s3, and s4), at most four execution plans are generated. Thus, each execution plan indicates how to execute the query against the set of XML documents, within the heterogeneous XML table, that conform to a particular XML schema. At step 206, each of the plurality of execution plans are used to execute the query relative to those XML documents, within the container, that conform to the XML schema associated with said each execution plan.

There are various ways in which execution plans may be specified and embodiments of the invention are not limited to any particular way. Execution plans may be generated from a child query that is based on the original query. For the purposes of illustration, execution plans are described in some sections below as being based on a child query. However, when implementing embodiments of the invention, the step of generating a child query may be omitted and an execution plan may be generated directly from the original query.

Child queries may be specified by using a CASE construct, or by using a UNION ALL construct. Each of these techniques for constructing execution plans will be described in greater detail hereafter.

Case Construct

According to an embodiment, an original query is compiled into a statement with a CASE construct that is executed at runtime. Each 'when' clause in a case statement may be considered a child query of the original query.

As an example of using the CASE construct, refer to table 100 described above that comprises a) schema column 120 ("SCHEMA_ID") indicating the XML schema to which the corresponding XML document conforms, and 2) column 160 ("DOC_REF") indicating references that may be used to access XML documents that conform to schema s1, s2, s3, and s4.

Suppose that docInstance( ) is a function that returns the schema identifier of a row in table 100. The query compiler, based on a query, performs static type checking and generates executions plans p1, p2, p3, and p4 that correspond to schemas s1, s2, s3 and s4, respectively. The query compiler may generate four "child queries", each encapsulated in the following new query:

```
select *
    case docInstance(x)
        when s1 then p1
        when s2 then p2
```

```
        when s3 then p3
        when s4 then p4
    end
from T;
```

Therefore, at runtime, if the execution engine determines that an XML document in table T (i.e. table 100) is an instance of schema s1, then the execution engine will execute plan p1. If the execution engine determines that an XML document is an instance of schema s2, then execution plan p2 is executed, and so forth.

As another example, suppose a user submits the following query statement:

select extractValue(/PO/POid)
from T
where exists(/PO/PODestCity)='SFO';

According to this query, the purchase order identifier (i.e. POid) of all purchase orders that have 'SFO' as the destination city are returned. After determining that table T (i.e. table 100) contains XML documents that conform to schemas s1, s2, s3, and s4, the query compiler may generate the following query:

```
select extractValue(/PO/POid)
from T
where
    case docInstance(x)
        when s1 then exists(/PO/PODestCity) = 'SFO'
        when s2 then exists(/PO/PODestCity) = 'SFO'
        when s3 then exists(/PO/PODestCity) = 'SFO'
        when s4 then exists(/PO/PODestCity) = 'SFO'
    end;
```

Optimizing Child Queries

It is possible to determine, based on an XML schema, that no documents that conform to the XML schema can satisfy the criteria of a query. In the above example of the original query, the "where" clause refers to PODestCity. However, as indicated in table 100, PO documents that conform to schema s2 do not have a corresponding purchase order destination city. Therefore, a child query corresponding to schema s2 may have never been generated, or at least an execution plan corresponding to schema s2 will not be generated. Thus, the query compiler may "prune" away any child queries (i.e. "when" clauses in this case) pertaining to XML schemas that are not applicable. Based on the above example, the original query,

```
select extractValue(/PO/POid)
from T
where exists(/PO/PODestCity) = 'SFO';
becomes,
select extractValue(/PO/POid)
from T
where
    case docInstance(x)
        when s1 then exists(/PO/PODestCity) = 'SFO'
        when s3 then exists(/PO/PODestCity) = 'SFO'
        when s4 then exists(/PO/PODestCity) = 'SFO'
    end;
```

A query compiler may further optimize a child query by indicating, in a corresponding execution plan, an index that the execution engine should access that is applicable to a node in a particular XML schema. For example, if an index exists on the PODestCity node specified in schema s1, then the execution plan corresponding to s1 will indicate the index to use when the execution engine executes the execution plan.

If the query compiler determines that only one XML schema is applicable for a particular query, then a CASE construct is not necessary. If, for example, only schema s3 has a PODestCity node, then the query compiler may generate the following query:

```
select extractValue(/PO/POid)
from T
where docInstance(x) = s3 && exists(/PO/PODestCity) = 'SFO';
```

Union All Construct

According to an embodiment, multiple child queries are generated based on a submitted query and the results of the queries are "unioned" together with a UNION ALL construct. Based on the same submitted query, using a UNION ALL construct yields the same results compared with using the CASE construct described above. Suppose a user submits the following query:

```
select extractValue(/PO/POid), extractValue(/PO/PODate)
from T
where exists(/PO/PODestCity) = 'SFO';
```

According to this query, the purchase order identifier (i.e. POid) and purchase order date (i.e. PODate) of all purchase orders that have 'SFO' as the destination city are returned. If schemas s1, s2, s3, and s4 are the only XML schemas represented in T (i.e. table 100), then at most four child queries would be generated, such as the following:

select extractValue(/PO/POid), extractValue(/PO/PODate)
    from POtab T
    where docInstance(x)=s1 && exists(/PO/PODestCity)= 'SFO';
    UNION ALL
    select extractValue(/PO/POid), extractValue(/PO/PODate)
    from POtab T
    where docInstance(x)=s2 && exists(/PO/PODestCity)= 'SFO';
    UNION ALL
    select extractValue(/PO/POid), extractValue(/PO/PODate)
    from POtab T
    where docInstance(x)=s3 && exists(/PO/PODestCity)= 'SFO';
    UNION ALL
    select extractValue(/PO/POid), extractValue(/PO/PODate)
    from POtab T
    where docInstance(x)=s4 && exists(/PO/PODestCity)= 'SFO';

If any of the XPaths specified in the original query do not exist in any of the XML schemas, then the corresponding child query either 1) may never have been generated or 2) at least may have been pruned away before runtime so that the corresponding child query would not be executed.

Child Cursors

Cursors are data structures that include an execution plan for executing a query. Typically, a query compiler generates a single cursor for each compiled query. In the case of child queries, a single cursor may comprise branching logic to an execution plan corresponding to each child query. However, a query compiler may instead generate multiple cursors.

Thus, according to an embodiment of the invention, master and child cursors are generated at compile time, where 1) each child cursor includes an execution plan corresponding to a different child query, and 2) the master cursor stores branching logic to each child cursor depending on the XML schema of an XML document. Then, during runtime, the execution engine selects the appropriate child cursor to execute.

Dynamic Heterogeneous XML Tables

As mentioned above, a heterogeneous XML table may not be limited to any particular set of XML schemas, in which case it is a DT. Therefore, in some cases, a query compiler may not "know" the XML schemas to which the XML documents in a DT conform. If the query compiler does not know the XML schemas of the documents targeted by the query, then the query compiler is unable to perform static type checking, nor any type-based optimizations on the query, before the query is executed.

However, it is likely that there will be some schemas that have multiple XML documents in the DT, as in table 100. Consequently, at runtime execution of a query, the execution engine may access a significant number of XML documents that conform to the same XML schema.

Multiple techniques shall be described hereafter to achieve, during execution of a query against a DT, performance results similar to executing queries against STs. Such techniques include using an execution plan cache, child cursors, dynamic sampling, and tracking DML operations. Each of these techniques shall be described in detail hereafter.

Execution Plan Cache

According to an embodiment, query execution against a DT is improved by maintaining a cache of execution plans. Specifically, during execution of a query against a DT, the query engine identifies the schema for each XML document (e.g. by reading the schema identifier in the schema column of the DT associated with the row of the XML document). After determining the XML schema of a document, the query engine examines the cache to determine whether an execution plan for the child query of that particular schema already exists in the cache. If the execution plan does not exist in the cache, then an execution plan for that particular schema is generated and saved in the cache. If the execution plan for the particular schema already exists in the cache, then that execution plan is used without having to generate another execution plan.

For example, with reference to table 100, suppose the following compiled query is to be executed:

```
select extractValue(/PO/POid)
from T
where
    case docInstance(x)
        when s1 then exists(/PO/PODestCity) = 'SFO'
        when s3 then exists(/PO/PODestCity) = 'SFO'
        when s4 then exists(/PO/PODestCity) = 'SFO'
    end;
```

The execution engine sequentially examines each row of table 100. Thus, at row 101, execution engine determines that the PO document corresponding to row 101 conforms to schema s3. Because the execution plan cache is initially empty, the execution engine generates an execution plan for PO documents that conform to schema s3 and saves the execution plan in the execution plan cache. At row 102, the execution engine determines that the PO document corresponding to row 102 conforms to schema s2. Because a child query does not exist for PO documents that conform to schema s2, the execution plan cache is not examined and an execution plan is not generated.

At row 103, the execution engine determines that the PO document corresponding to row 103 conforms to schema s3. The execution engine examines the execution plan cache and determines that an execution plan already exists for PO documents that conform to schema s3. Thus, the execution engine uses that execution plan instead of generating another execution plan for schema s3.

At row 104, the execution engine determines that the PO document corresponding to row 104 conforms to schema s1. The execution engine examines the execution plan cache and determines that an execution plan does not yet exists for PO documents that conform to schema s4. Thus, the execution engine generates an execution plan for PO documents that conform to schema s1 and saves the execution plan in the execution plan cache. This process repeats for each row in table 100.

In one embodiment, the execution plans that were generated and cached during execution of a query are deleted upon completion of the query so that the storage space they consume may be reused for other purposes. However, in an alternative embodiment, the cached execution plans may be persistently stored between query executions. (Persistently storing execution plans applies to STs as well as DTs). Storing cached execution plans between query execution may be useful, for example, for certain queries that target a heterogeneous XML table that are executed on a regularly basis. For example, suppose a report is generated each week that indicates the number of purchase orders received for a particular product during the previous week. Thus, the same query is submitted each week to generate the report. Therefore, execution plans pertaining to that query may be maintained continually and reused in order to avoid generating identical execution plans.

Cache Replacement Policies

Eventually, the execution plan cache that is used to improve the performance of queries that target a DT may become full. If the cache is full when a new execution plan must be stored in the cache, then one or more cached execution plans must be removed/replaced. According to an embodiment, a number of cache replacement policies may be used to control the cache's size by deleting execution plans that are less useful. For example, the least frequently used execution plans and/or the least recently used execution plans may be deleted from the cache. As another example, an execution plan is deleted based on a deletion of one or more XML documents.

Dynamic Sampling

According to an embodiment, the execution engine performs dynamic sampling to identify the XML schemas to which at least some of the XML documents stored in a DT conform. For example, before the start of executing an query, the following sampling query may be executed to identify the XML schemas represented in the DT:

```
select getSchemaId(value(T)), count(*)
from T
group by getSchemaId(value(T))
```

Execution of the foregoing query returns the set of XML schema identifiers in table T and the number of XML document instances that conform to the corresponding XML schema. Based on this returned information about the set of XML schemas in table T, the compiler knows what child queries to generate. The information may also be used to determine which execution plans will be cached. For example, if only one XML document in table T conforms to schema s2, then an execution plan corresponding to schema s2 may not be cached if the cost to cache the execution plan outweighs the benefit of caching the execution plan. The number of XML document instances that conform to the corresponding XML schema may also be used to determine which plans are stored between query executions.

In one embodiment, the foregoing query is executed against a portion of a DT. Such a query may be desirable if the DT is relatively large (e.g. 10,000 rows) and if a partial sampling (e.g. randomly chosen 100 rows) indicates most (if not all) of the XML schemas represented in the DT. However, such a rough sampling may not identify all the XML schemas. Thus, this rough sampling technique may be combined with the execution plan cache technique described above in order to execute the query against all documents in the heterogeneous XML table.

Tracking DML Operations

Another way to determine which XML schemas are represented in a DT and how many XML schemas are represented in a heterogeneous XML table (ST or DT) is by tracking DML operations. According to an embodiment, whenever an XML document conforming to a new XML schema is added to a DT, an identifier identifying the new XML schema is stored. Also, an identifier to an XML schema may deleted if the last XML document conforming to the XML schema is deleted from the DT. Additionally, the number of XML documents in a heterogeneous XML table conforming to a particular schema may be maintained by (1) incrementing the count associated with a schema when a document that conforms to the schema is inserted into the table, and (2) decrementing the count associated with a schema when a document that conforms to the schema is deleted from the table.

For example, an XML schema tracking table is generated, such as the following, and comprises two columns: one for an XML schema identifier and one for a count that indicates how many PO documents are stored or identified in table 100 that conform to the corresponding XML schema.

| SCHEMA_ID | COUNT |
|---|---|
| S1 | 7 |
| S2 | 18 |
| S3 | 54 |
| S4 | 21 |

With this type of information about each XML schema represented in a heterogeneous table, when a query that targets a DT is compiled, the compiler 1) may access the XML schema tracking table to identify all the XML schemas represented in the DT and 2) generate child queries for each of the identified XML schemas. In this way, the query compiler knows, at compile time, all the XML schemas that are represented in a DT.

Additional statistics may be maintained that indicate, for each schema, a last time the schema was identified in a previous query.

The statistics maintained in the XML schema tracking table may also determine whether some execution plans are cached (as is described above with respect to dynamic sampling). For example, if the XML schema tracking table indicates that only one or two XML documents conform to schema s1, then the execution plan pertaining to schema s1 may not be stored in the cache of execution plans, since the cost of storing the execution plan may outweigh the benefit of reusing the execution plan only a few times. The statistics maintained in the XML schema tracking table may also be used to determine which plans are stored between query executions.

Such statistics gathering may be performed independent of query execution or as part of query execution. The invention is not limited to one or the other.

Furthermore, an XML schema tracking table may be used to preemptively compile queries. For example, in response to an XML document conforming to a new schema being added to an ST or DT, and before a query is issued, the compiler may proactively generate and store an execution plan for the query relative to the new schema.

For example, suppose one hundred XML documents conforming to schema s5 are added to a DT which did not previously store XML documents conforming to schema s5. A regularly submitted query, such as the weekly purchase order query described above, may be compiled against schema s5 even before the report is required to be generated.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
    receiving a database statement that targets a table that contains a plurality of XML documents, wherein at least two of the XML documents in the table do not conform to the same XML schema;
    wherein the table comprises (a) a plurality of rows that each stores data for a different XML document and (b) a column that indicates, for each row, the schema to which the corresponding XML document conforms;
    in response to receiving the database statement, generating a plurality of execution plans for said database statement;
    wherein each execution plan of said plurality of execution plans corresponds to a different XML schema;
    wherein each execution plan of the plurality of execution plans is optimized based on the XML schema to which said execution plan corresponds;
    producing a plurality of intermediate results by using each execution plan, of the plurality of execution plans, to execute the database statement relative to only those XML documents, within the table, that conform to the XML schema associated with the execution plan;
    wherein using said each execution plan to execute the database statement includes, for each row of two or more rows of the table, using one or more values from the column of the table to determine the XML schema to which the corresponding XML document conforms; and
    generating a final result for the database statement based on the plurality of intermediate results;
    wherein the steps are performed on one or more computing devices.

2. The method of claim 1, wherein:
    the table is explicitly limited to a particular set of XML schemas; and
    a database statement compiler generates the plurality of execution plans at compile time.

3. The method of claim 1, further comprising, after the database statement has been executed and before a subsequent database statement has been received, the steps of:
    adding a new execution plan to the plurality of execution plans based on an addition of one or more XML documents to the plurality of XML documents; and
    deleting an execution plan from the plurality of execution plans based on a deletion of one or more second XML documents from the plurality of XML documents.

4. The method of claim 1, further comprising the steps of:
    determining that a particular XML schema has changed;
    deleting, from the plurality of execution plans, an execution plan that corresponds to XML documents that conform to the particular XML schema; and
    based on the particular XML schema, adding a new execution plan to the plurality of execution plans.

5. The method of claim 1, wherein generating a plurality of execution plans includes generating a second database statement that comprises the plurality of execution plans, wherein each execution plan of the plurality of execution plans is included in a separate CASE branch of the second database statement.

6. The method of claim 1, wherein: generating the plurality of execution plans includes generating two or more database statements; and
    the results of the two or more database statements are grouped by one or more union operators.

7. The method of claim 1, further comprising the steps of:
    determining that an execution plan from the plurality of execution plans is capable of being optimized based on an index, wherein the key of the index is based, at least partially, on an XPath specified in the database statement; and
    accessing the index during execution of the execution plan.

8. The method of claim 1, further comprising the steps of:
determining that a execution plan from the plurality of execution plans is capable of being optimized based on an index, wherein the key of the index is based, at least partially, on a specific schema; and
accessing the index during execution of the execution plan.

9. The method of claim 1, further comprising the steps of:
determining that a schema to which a particular subset of XML documents conform does not include an XPath specified in said database statement; and
determining to not generate a execution plan corresponding to said schema.

10. The method of claim 1, further comprising the steps of:
determining that a schema to which a particular subset of XML documents conform does not include an XPath specified in said database statement; and
determining to not execute the execution plan that corresponds to said schema.

11. The method of claim 1, further comprising the step of generating a cursor that includes an execution plan for each execution plan of the plurality of execution plans.

12. The method of claim 1, further comprising the step of generating a cursor for each execution plan of the one of the plurality of execution plans, wherein each cursor includes an execution plan for the corresponding execution plan.

13. The method of claim 1, wherein the database statement specifies a data manipulation language (DML) operation.

14. The method of claim 1, wherein generating the plurality of execution plans includes accessing one or more XML schemas to perform type checking, of one or more variables specified in the database statement, at compile time.

15. The method of claim 1, wherein the table is not explicitly limited to a particular set of XML schemas.

16. The method of claim 15, wherein:
the plurality of XML documents in the table conform to a plurality of XML schemas; and
the method further comprising the steps of, during execution time of the database statement:
identifying a particular schema of a particular XML document in the table;
generating an execution plan for the database statement relative to the particular schema; and
using the execution plan to process the database statement relative to the particular XML document.

17. The method of claim 16, wherein:
said particular XML document is a first XML document;
said particular schema is a first schema;
the method further comprising the steps of, during execution time of the database statement:
identifying a second schema of a second XML document in the table, wherein the second schema is different from the first schema;
generating the a second execution plan for the database statement relative to the second schema; and
using the second execution plan to process the database statement relative to the second XML document.

18. The method of claim 16, wherein:
said particular XML document is a first XML document;
said particular schema is a first schema;
the method further comprising the steps of, during execution time of the database statement:
after generating the execution plan associated with the first schema, storing the execution plan;
determining that a second XML document in the table conforms to the first schema;
retrieving the stored execution plan; and
using the execution plan to process the database statement relative to the second XML document.

19. A machine-readable storage medium storing instructions which, when executed by one or more processors, cause the one or more processors to perform the steps recited in claim 1.

20. A machine-readable storage medium storing instructions which, when executed by one or more processors, cause the one or more processors to perform the steps recited in claim 2.

21. A machine-readable storage medium storing instructions which, when executed by one or more processors, cause the one or more processors to perform the steps recited in claim 3.

22. A machine-readable storage medium storing instructions which, when executed by one or more processors, cause the one or more processors to perform the steps recited in claim 4.

23. A machine-readable storage medium storing instructions which, when executed by one or more processors, cause the one or more processors to perform the steps recited in claim 5.

24. A machine-readable storage medium storing instructions which, when executed by one or more processors, cause the one or more processors to perform the steps recited in claim 6.

25. A machine-readable storage medium storing instructions which, when executed by one or more processors, cause the one or more processors to perform the steps recited in claim 7.

26. A machine-readable storage medium storing instructions which, when executed by one or more processors, cause the one or more processors to perform the steps recited in claim 8.

27. A machine-readable storage medium storing instructions which, when executed by one or more processors, cause the one or more processors to perform the steps recited in claim 9.

28. A machine-readable storage medium storing instructions which, when executed by one or more processors, cause the one or more processors to perform the steps recited in claim 10.

29. A machine-readable storage medium storing instructions which, when executed by one or more processors, cause the one or more processors to perform the steps recited in claim 11.

30. A machine-readable storage medium storing instructions which, when executed by one or more processors, cause the one or more processors to perform the steps recited in claim 12.

31. A machine-readable storage medium storing instructions which, when executed by one or more processors, cause the one or more processors to perform the steps recited in claim 13.

32. A machine-readable storage medium storing instructions which, when executed by one or more processors, cause the one or more processors to perform the steps recited in claim 14.

33. A machine-readable storage medium storing instructions which, when executed by one or more processors, cause the one or more processors to perform the steps recited in claim 15.

34. A machine-readable storage medium storing instructions which, when executed by one or more processors, cause the one or more processors to perform the steps recited in claim 16.

35. A machine-readable storage medium storing instructions which, when executed by one or more processors, cause the one or more processors to perform the steps recited in claim 17.

36. A machine-readable storage medium storing instructions which, when executed by one or more processors, cause the one or more processors to perform the steps recited in claim 18.

37. A method comprising the steps of:

receiving a database statement that targets a container that contains a plurality of XML documents, wherein at least two of the XML documents in the container do not conform to the same XML schema;

in response to receiving the database statement, generating a plurality of execution plans for said database statement;

wherein each execution plan of said plurality of execution plans corresponds to a different XML schema;

wherein each execution plan of the plurality of execution plans is optimized based on the XML schema to which said execution plan corresponds;

producing a plurality of intermediate results by using each execution plan, of the plurality of execution plans, to execute the database statement relative to those XML documents, within the container, that conform to the XML schema associated with the execution plan;

generating a final result for the database statement based on the plurality of intermediate results; and maintaining a set of statistics that indicate, for each schema in a plurality of schemas, a number of XML documents in the plurality of XML documents that conform to said each schema;

wherein the set of statistics are generated by performing one or more of the following:

(a) executing a query against the container to determine the number of XML documents in the plurality of XML documents that conform to said each schema, or (b) for each schema of the plurality of schemas, incrementing a count that corresponds to said each schema when a new XML document that conforms to said each schema is added to the container and decrementing said count when an XML document, of the plurality of documents, that conforms to said each schema is deleted from the container;

wherein the steps are performed on one or more computing devices.

38. The method of claim 37, further comprising performing at least one of the following steps based on the set of statistics:

deleting a execution plan from the plurality of execution plans; or adding a new execution plan to the plurality of execution plans.

39. The method of claim 37, wherein the plurality of XML documents are stored in at least one of the following: a table, a collection, a folder, a virtual folder, a directory, a view, a function, and a stream of documents.

40. The method of claim 37, wherein the container is not explicitly limited to a particular set of XML schemas.

41. A machine-readable storage medium storing instructions which, when executed by one or more processors, cause the one or more processors to perform the steps recited in claim 40.

42. A machine-readable storage medium storing instructions which, when executed by one or more processors, cause the one or more processors to perform the steps recited in claim 37.

43. A machine-readable storage medium storing instructions which, when executed by one or more processors, cause the one or more processors to perform the steps recited in claim 38.

44. A machine-readable storage medium storing instructions which, when executed by one or more processors, cause the one or more processors to perform the steps recited in claim 39.

* * * * *

UNITED STATES PATENT AND TRADEMARK OFFICE
CERTIFICATE OF CORRECTION

| | | |
|---|---|---|
| PATENT NO. | : 7,577,642 B2 | Page 1 of 1 |
| APPLICATION NO. | : 11/486794 | |
| DATED | : August 18, 2009 | |
| INVENTOR(S) | : Zhen Hua Liu et al. | |

It is certified that error appears in the above-identified patent and that said Letters Patent is hereby corrected as shown below:

In column 3, line 60, delete "wildecard" and insert -- wildcard --, therefor.

In column 4, line 17, delete "DESCRIPTION" and insert -- BRIEF DESCRIPTION --, therefor.

In column 17, line 54, in claim 17, delete "the a" and insert -- the --, therefor.

Signed and Sealed this

Twenty-fourth Day of August, 2010

David J. Kappos
*Director of the United States Patent and Trademark Office*